United States Patent
Antonacci

(10) Patent No.: US 11,846,545 B2
(45) Date of Patent: Dec. 19, 2023

(54) DEVICE AND METHOD FOR THE SPECTROSCOPIC ANALYSIS OF BRILLOUIN SCATTERED LIGHT

(71) Applicants: Specto S.r.L., Milan (IT); Fondazione Istituto Italiano di Tecnologia, Genoa (IT)

(72) Inventor: Giuseppe Antonacci, Rome (IT)

(73) Assignees: Specto S.r.l., Milan (IT); Fondazione Istituto Italiano di Tecnologia, Genoa (IT)

( * ) Notice: Subject to any disclaimer, the term of this patent is extended or adjusted under 35 U.S.C. 154(b) by 313 days.

(21) Appl. No.: 17/288,035

(22) PCT Filed: Oct. 22, 2019

(86) PCT No.: PCT/IB2019/058982
§ 371 (c)(1),
(2) Date: Apr. 23, 2021

(87) PCT Pub. No.: WO2020/084466
PCT Pub. Date: Apr. 30, 2020

(65) Prior Publication Data
US 2021/0396581 A1   Dec. 23, 2021

(30) Foreign Application Priority Data
Oct. 24, 2018 (IT) .................... IT102018000009753

(51) Int. Cl.
*G01J 3/44* (2006.01)
*G01J 3/02* (2006.01)
*G01N 21/63* (2006.01)

(52) U.S. Cl.
CPC ........... *G01J 3/4412* (2013.01); *G01J 3/0218* (2013.01); *G01N 2021/638* (2013.01)

(58) Field of Classification Search
CPC .......... G01J 3/4412; G01J 3/0218; G01J 3/44; G01J 3/0256; G01J 3/12; G01J 3/42; G01J 3/02; G01N 2021/638; G02B 6/12007
See application file for complete search history.

(56) References Cited

U.S. PATENT DOCUMENTS

| | | | |
|---|---|---|---|
| 4,720,160 A * | 1/1988 | Hicks, Jr. ............. | G02B 6/2821 385/47 |
| 7,903,906 B2 * | 3/2011 | Smith ................ | G01N 21/7746 385/12 |

(Continued)

FOREIGN PATENT DOCUMENTS

WO   WO2014190331 A2   11/2014

OTHER PUBLICATIONS

Written Opinion & International Search Report for PCT/IB2019/058982 dated Feb. 6, 2020, 9 pages.

*Primary Examiner* — Abdullahi Nur
(74) *Attorney, Agent, or Firm* — Reising Ethington P.C.

(57) ABSTRACT

Spectrometer for analyzing the spectrum of a Brillouin scattered light including input means receiving the scattered light, and selecting means for selecting and separating specific multiple frequency components of the scattered light. The selecting means has at least one main input, and at least an optical detector is coupled to the selecting means for measuring the intensity of the different frequency components and reconstructing the spectrum profile of the scattered light. The selecting means include an optical integrated circuit having at least one optical ring resonator of a first type having an input waveguide for receiving the light from the input means, a closed loop waveguide having an effective refractive index $n_{\mathit{eff}}$ and an output waveguide. The selecting means further have at least a modulator element of (Continued)

the effective refractive index $n_{eff}$ coupled to the closed loop waveguide of the optical ring resonator of the first type.

10 Claims, 16 Drawing Sheets

(56) References Cited

U.S. PATENT DOCUMENTS

| | | | |
|---|---|---|---|
| 9,140,914 B1* | 9/2015 | Ptasinski | G02F 1/132 |
| 9,748,726 B1* | 8/2017 | Morton | H01S 3/08013 |
| 9,989,785 B2* | 6/2018 | Amberg | G02F 1/0121 |
| 11,002,912 B2* | 5/2021 | Matres | G02B 6/4286 |
| 2003/0123780 A1* | 7/2003 | Fischer | G02F 1/035 |
| | | | 385/39 |
| 2004/0202430 A1* | 10/2004 | Scheuer | G02B 6/12007 |
| | | | 385/50 |
| 2006/0051010 A1* | 3/2006 | Chu | G02B 6/12007 |
| | | | 385/5 |
| 2009/0122817 A1* | 5/2009 | Sato | G02B 6/12007 |
| | | | 372/20 |
| 2017/0331550 A1 | 11/2017 | Liu et al. | |
| 2018/0267246 A1* | 9/2018 | Zhang | G02B 6/29338 |

* cited by examiner

DEVICE AND METHOD FOR THE SPECTROSCOPIC ANALYSIS OF BRILLOUIN SCATTERED LIGHT

TECHNICAL FIELD

The present invention refers to a Brillouin spectrometer and an apparatus for Brillouin spectroscopy, microscopy or endoscopy that uses said spectrometer. Furthermore, the present invention refers to a method to analyze the spectrum of the inelastic Brillouin scattering and to the use of at least one optical ring resonator to measure the intensity of different frequency components of a scattered light of Brillouin and to analyze the spectrum of said scattered light. In addition, the present invention refers to a method to reduce the dimensions of an optical system for Brillouin spectroscopy, microscopy or endoscopy addressed to the analysis of the mechanical and structural properties of a specimen.

STATE OF THE ART

Brillouin microscopy is an emerging imaging technique that combines confocal microscopy with Brillouin spectroscopy to optically measure the mechanical properties of matter. Brillouin light scattering is an inelastic scattering process arising from the interaction of light with the spontaneous acoustic waves of matter (acoustic phonons). The light scattered elastically (Rayleigh) by a biological system has the same frequency of the illumination. Nevertheless, the spectrum exhibits two sidebands, typically referred to as the Brillouin Stokes (SB) and Brillouin Anti-Stokes (ASB) peaks, which are slightly shifted by 1-20 GHz from the Rayleigh frequency.

The frequency and the linewidth of the Brillouin peaks are indicative of the viscoelastic properties of a specimen. In details, given a known density and a refractive index of a material, the frequency shift and the linewidth of the Brillouin peaks provide information on the characterization of the longitudinal modulus of the material at frequencies in the order of GHz.

Standard methods to measure the material mechanical properties need a physical contact with the specimen, which in turn makes these methods invasive and limited to surface topographies. Conversely, Brillouin microscopy or endoscopy use a light beam as a probe to avoid any physical contact. Brillouin microscopy measures the mechanical properties with an optical resolution below a micron (micrometer) and provides a three-dimensional analysis in the volume of biological systems (e.g. cells and tissues).

Given the critical role of the biomechanical properties in several diseases such as atherosclerosis, cancer and glaucoma, Brillouin spectroscopy has great potentials to become a novel diagnostic instrument in the biomedical field. To date, confocal Brillouin microscopy has enabled a wide range of biomechanical investigations including, as an example, the biomechanical assessment of the eye in-vivo, the quantification of the atherosclerotic plaque stiffness, the analysis of the bacterial meningitis and the three-dimensional investigation of the cellular biomechanics as well as their changes in response to chemical stimuli.

The main component in Brillouin spectroscopy, microscopy or endoscopy is the spectrometer, which requires a sub-GHz spectral resolution and a high spectral contrast. A high spectral contrast is indeed required to measure turbid biological samples, where both the light scattered elastically and specular reflections are orders of magnitude higher than the weak Brillouin light signal. When the background elastic light exceeds the contrast of the spectrometers, parasitic crosstalk signals arise along the dispersion axis, which overwhelm the Brillouin peaks that have a lower intensity. As described in S. M. Lindsay et al. *J. Phys. E* 10, 150 (1977), in Brillouin spectroscopy the specimen is illuminated by a laser beam and the light scattered is spectrally analyzed using multipass Fabry-Perot (FP) interferometers arranged in tandem. Although the FP interferometers and the other "etalons" have a notable contrast and spectral resolution, these typically require a long (>1 sec) integration time (dwell time) that limits Brillouin spectroscopy to single point measurements, preventing the extension to an imaging technique.

In the last decades, a new type of FP etalon interferometer, known as VIPA (Virtual Imaged Phased Array), has been introduced. Adoption of VIPA spectrometers in Brillouin spectroscopy has decreased the data acquisition time from a few tens of seconds to approximately 100 msec with minimal optical power (<10 mW), enabling at the same time the extension of Brillouin spectroscopy as a non-contact three-dimensional imaging modality for mapping the viscoelastic biomechanical properties in the volume of biological systems. Despite their efficiency, conventional VIPA spectrometers are intrinsically limited by a spectral contrast of approximately 30 dB. The existing methods to increase the spectral contrast in Brillouin microscopy involve the use of multi-stage VIPA located in tandem [G. Scarcelli et al. *Opt. Express* 19, 10913 (2011)]. Nevertheless, this involves a reduced throughput efficiency of 25% and consequently an increase in the imagine acquisition time. Moreover, multi-stage VIPA spectrometers require a large number of optical components, which make these systems expensive and difficult to align.

The scope of the present invention is to partially or fully overcome the abovementioned shortcomings of current systems and to provide optical devices, such as spectrometers, that are fast, compact and high contrast as well as capable of providing measurements on biological and non-biological samples using Brillouin spectroscopy, microscopy and endoscopy, from which it is possible to retrieve mechanical or structural properties on the samples analyzed.

DESCRIPTION OF THE INVENTION

Here, it is introduced a spectrometer and a method to analyze the spectrum of the Brillouin scattering light. It is further described an apparatus that uses said spectrometer and the use of at least one optical ring resonator to measure the intensity of several frequency components of the Brillouin scattered light to analyze the spectrum of said scattered light according to the independent claims.

The spectrometer according to the present invention is applicable to the analysis of the spectrum of the inelastic scattered light such as the Brillouin scattered light. In particular, this type of scattered light can be generated from the interaction of a light beam and a target biological material, or in more details from the interaction between the photons of the laser beam and the acoustic phonons of the analyzed material. Such spectrometer can also be used to analyze the spectrum of the Raman-THz scattered light.

The spectrometer according to the present invention comprises input means to receive the scattered light and selecting means coupled to the input means to select and separate multiple frequency components of the scattered light, wherein said selecting means comprise at least one main input. Furthermore, the spectrometer comprises at least an optical detector coupled to the selecting means for measuring the intensity of the different frequency components and reconstructing the spectrum profile of the scattered light.

The input means can, for example, comprise an optical fiber, specifically an optical fiber coupler that interfaces with the main input of the selecting means. In other words, the scattered light is coupled to the selecting means by means of the fiber coupler and passing through the main input port, which may consist of a simple aperture or a waveguide such as another optical fiber.

The selecting means are needed to receive all the scattered light and to separate different frequency components of the light collected. For example, the selecting means are configured such as to select and separate a single frequency component from the scattered light and to direct it to an optical detector. The frequency components that are not selected will not be directed to the optical detector. Given the nature of Brillouin scattering, the selecting means are, for example, capable of selecting or highlighting the inelastic components of the scattered light to analyze in great details the chemo-physical properties of the target material.

The spectrometer can comprise one or more optical detectors to spectrally analyze the selected frequency components. As an example, the optical detector can be a photomultiplier, a photodetector or an array of pixels, such as those present in a CCD camera.

In more details, the optical detector can be decoupled from the selecting means and can be coupled to them at the main output of the selecting means. Alternatively, one or more detectors can be integrated to the selecting means and being part of, for example, a single system or chip. In such case, each output waveguide is directly coupled to the associated optical detector that is miniaturized and integrated into the chip.

Inside the spectrometer of the present invention, the selecting means can be constituted by an optical integrated circuit having at least an input port, at least one output port and at least a pass port. In addition, the optical integrated circuit comprises at least an optical ring resonator of a first type having an input waveguide to receive the light, a closed ring waveguide having an effective refractive index $n_{eff}$ coupled to the input waveguide to select at least a specific frequency $v_{res}$ of the scattered light, an output waveguide coupled to the closed ring waveguide for the output of the selected frequencies, and a pass waveguide coupled to the input waveguide and the closed ring waveguide for the output of the frequencies that are not selected.

The frequency $v_{res}$ is given by the following relation:

$$v_{res} = \frac{cm}{n_{eff} 2\pi R}, m = 1, 2, 3 \ldots$$

where c is the light speed and R is the radius of the optical ring resonator.

The term "effective refractive index" refers to the effective velocity at which the light travels inside the waveguide with respect to the light speed in the vacuum (c). This index is obtained from some parameters such as the refractive index of materials of the waveguide core and cladding, as well as from the dimension (width and height) of the waveguide core.

The term "optical ring resonator of the first type" is here referred to an optical ring resonator that is specifically addressed to select specific frequency components of the scattered light and to transmit these components towards the optical detector. The optical resonator is represented by a set of waveguides that are suitably coupled to each other, an input waveguide, an output waveguide and a closed ring waveguide. When the frequency of the light beam that travels inside the closed ring waveguide matches the resonant frequency $v_{res}$ of the ring, this frequency is transmitted with a certain intensity (which depends on the optical coupling and propagating losses of the ring resonator) to the output waveguide and thus to the optical detector. On the other hand, the frequency components that are not selected by the ring, i.e. the non-resonant frequencies, are conducted towards a pass waveguide coupled to the input waveguide.

The spectrometer according to the present invention is also characterized by the fact that the selecting means comprises at least a modulating element coupled to the closed ring waveguide of the optical ring resonator to modulate the effective refractive index $n_{eff}$ and to scan the different frequency components through the variation of the optical path of the closed ring waveguide. The modulating element acts on the optical resonator and specifically on the optical path of the waveguide to tune or modulate the resonant frequency of the optical ring resonator. Following this approach, it is possible to scan the different frequency components of the scattered light and to reconstruct the spectrum of such scattered light by directly acting on the modulator and using, as an example, a single optical detector at the output. To finely tune the resonant frequency, the scan of the optical cavity can be accomplished by varying the effective refractive index of the optical ring resonator. As an example, the modulating element can be realized by a series of micro heaters, i.e. electrical resistors, connected in series to which a voltage is applied. These micro heaters can be located above or at the sides of the ring waveguide of the optical resonator. By means of the micro heaters of this type, it is possible to obtain a scan of the different frequency components (with at least a MHz rate). Since the resonant frequency $v_{res}$ is indeed proportional to the effective refractive index $n_{eff}$, only a single frequency of the light propagating through the ring waveguide would be transmitted at each discrete variation of the applied voltage. Following this approach, the entire spectral profile composed by the elastic Rayleigh component and the inelastic (Stokes and Anti-Stokes) components can be accurately reconstructed after a scan of the frequencies of the propagating light signal and after measuring their associated intensity by means of an optical detector. Alternatively or in combination with the abovementioned example, the modulating element can be realized through a piezoelectric or birefringent element into the ring of the optical resonator to which is applied a voltage so as to vary the optical path of the resonator.

Using a configuration of this type, it is possible to obtain a spectrometer that is suitable for Brillouin spectroscopy (or eventually also for Raman-THz spectroscopy) and provide a higher spectral contrast than the standard devices. In fact, by appropriately selecting the geometry as well as the materials of the waveguide of the optical ring resonator, the frequencies to be analyzed can be selected with extreme precision. Furthermore, the scan of the different frequency components can be accurately accomplished by means of the modulator that directly acts on the effective refractive index of the optical resonator waveguide.

The selecting means may also consist of a photonic integrated circuit realized on a substrate that can be made of different materials. The spectrometer can be therefore defined as a "on-chip" optical device. As such, the circuit, or chip, comprises an input port, or input, which in this case corresponds to the input waveguide, one or more output ports, or drop, which corresponds to the output waveguide, and a pass port, or pass, which corresponds to the pass waveguide. The possibility of using circuits with optical ring resonators to select and separate the different frequency components as well as the use of modulators integrated in the waveguide of the resonator and operating through the application of an external voltage enables the employment of the PIC (photonic integrated circuit) technology and thus to miniaturize such spectrometer. In fact, it is possible to substitute the different elements of the spectroscopic system such as lenses, mirrors, gratings, polarizers, scatterers, etc, with a single chip that is capable of guiding the light through different paths by acting on the different refractive indexes of the materials used to fabricate the chip. This chip or integrated circuit shows several advantages with respect to conventional spectrometers used in Brillouin spectroscopy. In fact, while the latter are complex systems of substantially large dimension (which makes them not easy to use due to misalignments and highly optical lossy) an on-chip spectrometer according to the present invention has the advantage of being a miniaturized device, thus being robust and of high repeatability as well as being portable and easy to use. Moreover, there is no need to align opto-mechanical components as all the optical functions are integrated into the chip. The spectrometer according to the present invention has also the great advantage of significantly reducing the production costs as well as it is reproducible at a large scale.

The spectrometer according to the present invention can be integrated into a microscopy system for the three-dimensional imaging of the mechanical or structural properties of biological (and non-biological) samples. In Brillouin microscopy, a light beam characterized by a narrow frequency linewidth (<10 MHz) is focused to the analyzed specimen. The scattered light is collected by a lens and delivered to an optical fiber that delivers the light signal to the on-chip spectrometer according to the present invention, which analyzes the spectrum of the Brillouin scattered light from which it is possible to achieve mechanical and structural information of the specimen. The spectrometer according to the present invention can also be integrated in an endoscope for clinical applications, where an optical fiber probe is used to illuminate wall tissues (such as the esophagus or the arteries) of a human or animal body. The light scattered from such wall tissues is collected from the same optical fiber and analyzed through the on-chip spectrometer described by the present invention. Such an endoscope enables the in-vivo analysis of the mechanical and structural properties of organs and internal structures for the diagnosis of diseases such as cancer and atherosclerosis. The spectrometer according to the present invention can also be integrated into industrial devices used to manufacture materials such as films, adhesives and fibers, for the real-time characterization of their mechanical and structural properties.

According to an embodiment of the invention, the closed ring waveguide of the optical ring resonator of the first type can have a shape of a circle with a radius R or an oblong shape like an oval made of the conjunction of a central rectangular region with two semicircles at the opposite sides of said central region, wherein both semicircles have a diameter D=2R.

According to an embodiment of the invention, the radius R of the circle or of the semicircles of the closed ring waveguide of the optical ring resonator of the first type can have a value between 100.0 µm and 1.0 mm. This radius provides a Free Spectral Range (FSR) that is suitable for Brillouin spectroscopy in the range of 30 GHz and 120 GHz. The radius can however have a value of up to 100 µm in the case of the Raman THz spectroscopy, which requires a Free Spectral Range in the range of 0.3 THz and 6 THz.

According to an embodiment of the invention, which can be combined with one of the previous embodiments, the selection means consist of a optical integrated circuit that comprises a core region where the light travels inside the waveguides. This core region is made of a transparent material in the visible and near-infrared range, preferably of $Si_3N_4$. The circuit further comprises a cladding region which is made of a material having a refractive index lower than that of the core region, preferably $SiO_2$, which surrounds the core region. Furthermore, the circuit may comprise a semiconductor substrate, preferably Si. The effective refractive index can have a value in the range of $n_{eff}=1,4$ and $n_{eff}=1,8$. The use of $Si_3N_4$ has several advantages as it provides a low absorption of the visible radiation, has a high refractive index ($n_{SiN}\sim 2$) and is easily modulated by micro-heaters. However, other materials or a combination of materials that behave similarly may also be used. Moreover, the on-chip circuit can be covered by a thermally insulating material so as to limit temperature fluctuations, and therefore of refractive index, due to thermal variations occurring in the environment external to the chip.

The light scattered elastically having the same frequency as that incident beam is several orders of magnitude stronger than Brillouin inelastic peaks. This is particularly evident for the scattering by semi-transparent samples (e.g. biological tissues and cells), in which the intensity of the elastic background light can be more than 6 orders of magnitude higher than the Brillouin scattered light. For this reason, the detection of Brillouin spectra requires extremely high spectral contrast (i.e. the ability of the spectrometer to simultaneously distinguish weak spectral features in the presence of much stronger signals) or extremely high extinction (i.e. the ability of a spectrometer to suppress the strong background signal to increase the visibility of the weak spectral features). A single silicon ring optical resonator, for example on a silicon nitride waveguide, practically does not exceed the value of about $10^2$ neither for the spectral contrast (when operating at the drop port) nor for the extinction (when it operates at the pass port). As a result, a single optical ring resonator may not be sufficient to detect a Brillouin spectrum.

According to an embodiment of the invention, which can be combined with one of the previous embodiments, the selection means can comprise multiple optical ring resonators of the first type arranged in cascade, in which the closed ring waveguide of a first optical resonator is coupled with the ring waveguide of a second successive optical resonator. It should be noted that each optical resonator or only a subset of the plurality of optical ring resonators can be coupled to an associated modulator element having the same characteristics as the modulator element defined above. In this case, it is possible to increase the contrast and the spectral extinction by driving the light signal through a series of optical ring resonators. Since the PIC technology is used, the addition of several cascaded resonators does not significantly increase the dimensions of the spectrometer.

The advantage of using a plurality of cascading optical resonators originates from the fact that the intensity of the transmission function (I) of the spectrometer consists of the product of the transmission function (Ii) of each ring resonator, i.e. $I=\Pi_{i=1}^{N} I_i$, where N represents the total number of cascade ring resonators.

In Brillouin spectroscopy, the cascade arrangement of ring resonators represents a clear advantage over existing spectrometers as it enables the acquisition of the Brillouin spectrum without increasing the size or affecting the robustness and costs of the device. On the other hand, particular attention must be paid to simultaneously tune multiple ring resonators since the heating system associated to each ring may require a different voltage or current supply as a consequence of the different electrical resistance of the electrical circuits located near each ring. For this reason, according to an embodiment of the invention, which can be combined with one of the previous embodiments, the spectrometer comprises active alignment means enabling a feedback mechanism.

In the previous configuration comprising a plurality of cascaded ring resonators of the first type, each ring at the drop port must be detuned from the previous one. A detuning mechanism is needed to prevent the light signals transmitted through the drop port of a ring resonator from being reflected back and re-coupled to the same ring. This would create multiple frequency resonances between the cascaded rings that would have the effect of increasing the bandwidth (FWHM) of the intensity peaks transmitted at the output, in turn dramatically decreasing the total spectral resolution of the spectrometer. To detune the cascaded ring resonators, according to an embodiment of the invention, which can be combined with one of the previous embodiments, detuning means are positioned between one ring and the next. For example, said detuning means may consist of an intermediate BUS wave guide. In this way, each ring can be synchronized and tuned independently from any other ring placed in a cascade configuration. Advantageously, a sharper intensity peak at the output with a narrower bandwidth can be obtained when the ring resonators placed in a cascade configuration are tuned at the same resonance frequency, thereby avoiding the presence of undesired peaks and maximizing the obtainable spectral resolution of the spectrometer.

According to an embodiment of the invention, which can be combined with one of the previous embodiments, the selection means, which consist of a optical integrated circuit, can comprise at least one optical ring resonator of the second type for suppressing or attenuate the elastic components of the scattered light. The optical ring resonator of the second type is positioned between the input port of the optical integrated circuit and the optical ring resonator of the first type. In more details, the optical ring resonator of the second type comprises a pass waveguide coupled to the input waveguide of the optical ring resonator of the first type. Specifically, the optical ring resonator of the second type can comprise an input waveguide, a closed ring waveguide coupled to the input waveguide in which a pass waveguide is coupled to the input waveguide and to the closed ring waveguide. In more details, the pass waveguide of the optical ring resonator of the second type is coupled to the input waveguide of the optical ring resonator of the first type. According to another configuration, the optical resonator of the second type can also have a drop waveguide as in the case of the resonator of the first type. In this case, however, a drop port may be used to receive a feedback through a photodiode to actively align the ring with respect to the frequency of elastic light.

The term "optical ring resonator of the second type" is referred to an optical ring resonator dedicated to the attenuation or suppression of certain frequency components of the scattered light, i.e. the elastic light components. Unlike the optical ring resonator of the first type, which operates through the output port of the optical integrated circuit, the optical resonator of the second type operates through the passage port of the optical integrated circuit. This type of resonator is indeed not configured to lead the frequency components towards the optical detector but to lead them towards the input waveguide of at least one optical ring resonator of the first type. The ring resonator of the second type also has the effect of avoiding the saturation of the optical detector at the output due to the higher intensity of the elastic light component with respect to Brillouin's inelastic scattered light components.

Of course, the spectrometer can comprise a plurality of optical ring resonators of the second type arranged in cascade, in which the closed ring waveguide of a first optical resonator is coupled with the ring waveguide of the following optical resonator.

Similarly to the case of the optical ring resonators of the first type, the optical resonators of the second type (in whole or in part) can also be coupled to a modulator element acting on the effective refractive index according to the mode of operation already defined previously.

It should be noted that, in case the selection means consist of a optical integrated circuit, the configurations described above, in which there is a plurality of optical resonators of the first type and/or a plurality of optical resonators of the second type, are all realized with a single input port, or input, one or more output ports, or drops, and a single pass port, or pass. Moreover, the plurality of resonators (of the first and/or second type) can be distributed in other arrangements on the substrate of the circuit between the input port, the drop port and the pass port.

According to an embodiment of the invention, which can be combined with one of the previous embodiments, the distance between the closed ring waveguide and the input (and output) waveguide of the optical resonator of the first type can take a value between 50 nm and 500 nm. In this way it is possible to increase the coupling efficiency between the closed loop waveguide and the input waveguide of the optical resonator. In this regard, it should be noted that the optical ring resonator of the first type having an oblong shape such as that of an oval described above is particularly useful for obtaining a critical coupling in conditions where a circular shape of the ring would not allow a sufficient light coupling with the input waveguide or with the detuning means when they are configured as BUS waveguides. A lack of sufficient light coupling from the evanescent field coming from the input waveguide towards the loop waveguide determines a significant loss in the quality factor and therefore a limited contrast and extinction. This is for example the case of spectrometers in which the tight confinement of the light beam in the waveguide realized for example in SiN and a large ring radius (>100 μm) would impose a relatively small distance (<150 nm) between the ring and the input or BUS waveguide to obtain a light coupling in the ring greater than 10% and therefore to obtain a critical coupling. The geometry of the optical ring resonator of the first type having an oblong shape such as that of the oval described above ensures an increase in the extension of the coupling region and therefore an increase in the coupling coefficient enabling a greater tolerance in terms of the distance between the waveguides that can take values above 200 nm.

According to an embodiment of the invention, which can be combined with one of the previous embodiments, in the configuration of the spectrometer comprising a plurality of optical ring resonators of the first or second type arranged in cascade, the optical ring resonators can have a variable increasing or decreasing radius. The radius can vary with a factor between 0.9 and 0.999. The use of rings with different radii arranged in cascade yields an extension of the FSR because the combination of two or more rings of different radii results in a total value of the FSR that is given by the combination of all the FSRs associated with each cascaded ring without loss in the spectral resolution of the device. In Brillouin spectroscopy, this can be particularly useful for maintaining a high spectral resolution on a large spectral region of investigation along which the Brillouin peaks arise.

According to the present invention, an apparatus or machinery comprising the spectrometer according to one of the embodiments described above is also described. In more details, this apparatus is suitable for Brillouin spectroscopy, microscopy or endoscopy. The apparatus can thus comprise a light source such as a laser in the field of the visible (for example a laser at 400-650 nm) or in the near infrared (for example a laser at 650-1500 nm) and a target of biological material. The light scattered by the interaction between the laser and the target is thus coupled into the spectrometer via the input means as described above. The apparatus can further include one or more electronic computers connected to the optical detector and/or to the modulator element to conduct the spectral analysis, acquire the detected data and display the results. One or more wave function generators can also be used to send a specific electrical signal to the micro-heaters to conduct the frequency scan by modulating the effective refractive index of the ring waveguide. The wave function generators can also be coupled with an oscilloscope to facilitate the reading of the electrical input and output signal. One or more computers or PCs can be connected to the optical detector to receive and analyze the electrical signal containing information on the light spectrum.

According to the present invention, the method for analyzing the spectrum of the Brillouin light scattering comprises the following steps of:
  receiving a scattered light;
  selecting and separating certain multiple frequency components of the scattered light by leading the scattered light in an input waveguide of at least one optical ring resonator of a first type;
  scanning the different multiple frequency components by means of a modulator element which modulates the effective refractive index of a closed ring waveguide of said optical ring resonator of the first type through the variation of the optical path of the closed ring waveguide; and
  measuring the intensity of the frequency components and reconstructing the spectrum profile of the scattered light.

According to an embodiment of the invention, which can be combined with one of the previous embodiments, the method further comprises the step of:
  suppressing or attenuating the elastic components of the scattered light by leading the scattered light in an input waveguide of at least one optical ring resonator of a second type before selecting and separating the frequency components of the scattered light by means of the optical resonator ring of the first type.

Furthermore, the method may include the step of:
  analyzing the reconstructed spectral profile through a PC and fit this spectral profile through appropriate functions (e.g. Lorentzian, Gaussian or Damped Harmonic Oscillator) to obtain the values of both the frequency shift of the inelastic spectral peaks with respect to the elastic peak and of the linewidth of the inelastic spectral peaks.

Of course, all the effects and advantages of the spectrometer described above apply mutatis mutandis also to the characteristics and aspects of this method. Therefore, they will not be repeated here.

The present invention also describes the use of a optical integrated circuit comprising at least one ring optical resonator of a first type for measuring the intensity of different frequency components of the Brillouin scattered light and analyzing the spectrum of said scattered light. It is evident that in this case we are referring to an optical resonator having all the characteristics described previously used to analyze the scattered light according to the characteristics of the method described above. In more details, the scattered light is received by selecting and separating certain multiple frequency components of the light. This is accomplished by leading the scattered light in an input waveguide of an optical ring resonator of the first type. Furthermore, the different multiple frequency components are scanned by at least one modulator element which modulates the effective refractive index of a closed ring waveguide of said optical ring resonator of the first type by varying the optical path of the closed ring waveguide. Preferably, the closed ring waveguide of the optical ring resonator of the first type has a radius in the range of 100.0 μm and 1.0 mm. The optical integrated circuit comprises a core region where the light propagates in the waveguides, the core region being made of a transparent material in the visible and near-infrared spectrum, preferably in $Si_3N_4$. Also, the circuit comprises a cladding region made of a material having a refractive index lower than that of the internal region, preferably in $SiO_2$, which surrounds the core region, wherein the effective refraction index has a value between $n_{eff}=1.4$ and $n_{eff}=1.8$.

Of course, all the effects and advantages of the spectrometer and of the method described above apply mutatis mutandis also to the characteristics and aspects of this use. Therefore, they will not be repeated here.

This on-chip spectrometer can be integrated into existing Brillouin spectroscopy, microscopy or endoscopy systems for the analysis of the mechanical and structural properties of biological and non-biological samples. In other words, it is possible to convert a conventional optical spectroscopy system into a more compact and efficient system simply by using the spectrometer according to the present invention that replaces a traditional spectrometer, for example the one using a grating or a Fabry-Perot interferometer. In fact, the use of a spectrometer that uses a circuit with one or more optical resonators to measure the spectrum of the scattered light, and thus the use of a PIC (photonic integrated circuit) technology according to the present invention provides the possibility to miniaturize the spectrometer. Following this way, it is possible to remove the need for the different optical elements of the system, such as lenses, mirrors, gratings, polarizers, scatterers, etc. The chip is capable to guide the light through different paths by acting on the different refractive indices of the materials used to make the chip itself.

The present invention describes a method for reducing the dimensions of an optical system for Brillouin spectroscopy, microscopy or endoscopy and thus for the analysis of the mechanical and structural properties of a sample. Said optical system comprises at least one light source, preferably a laser, that illuminates said sample and generates the scattered light, an optical apparatus for receiving and measuring the spectrum of the scattered light by acquiring data as a function of the frequency of said scattered light, and a computer system for analyzing said data. The method comprises the step of replacing the optical apparatus with the spectrometer according to one of the embodiments described above.

These and other aspects of the present invention will become clearer after the following description of some preferred embodiments described below.

Figure 4A:
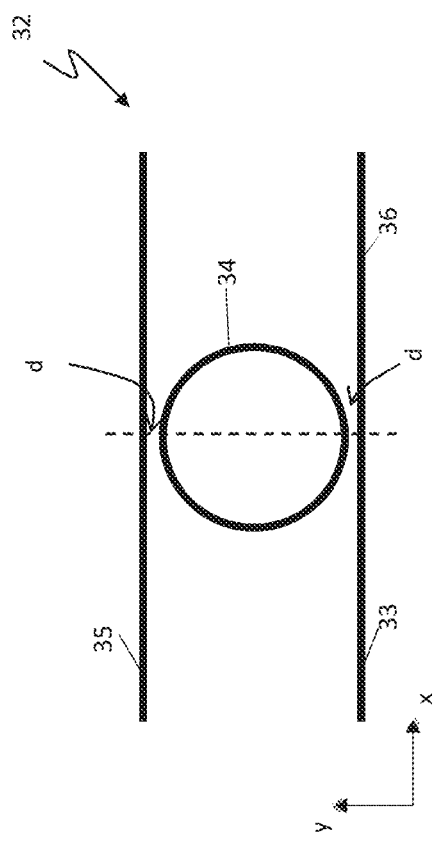
Figure 4B:
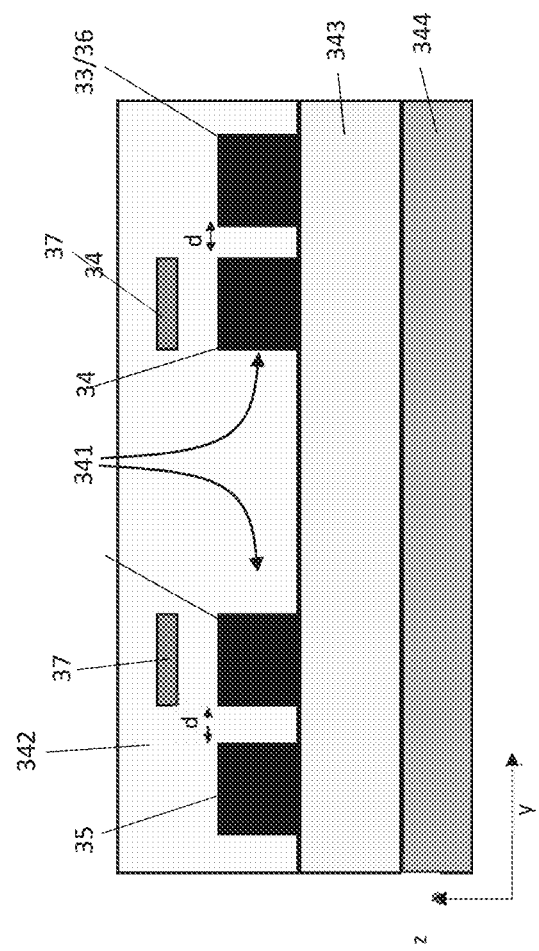
Figure 5A:
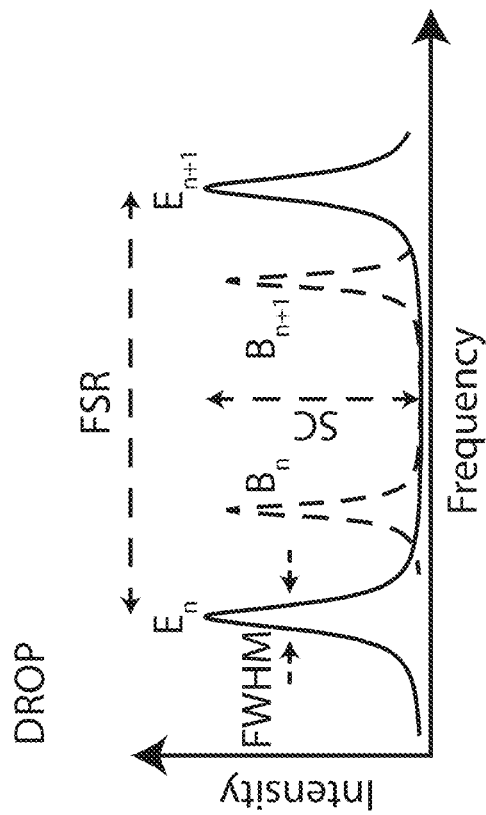
Figure 5B:
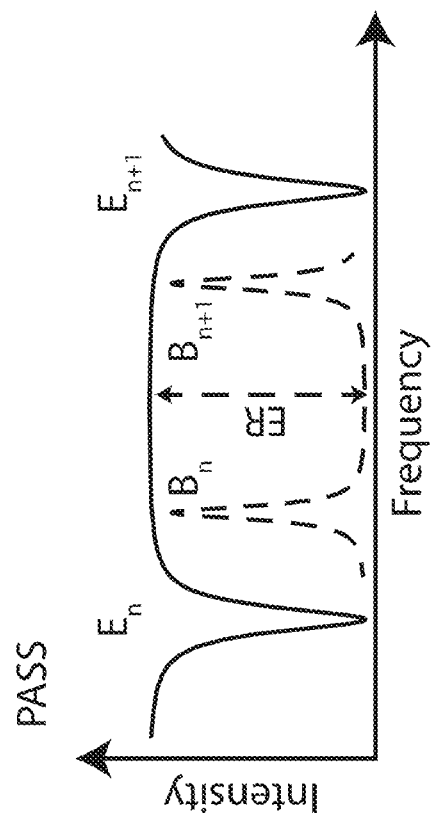
Figure 7:
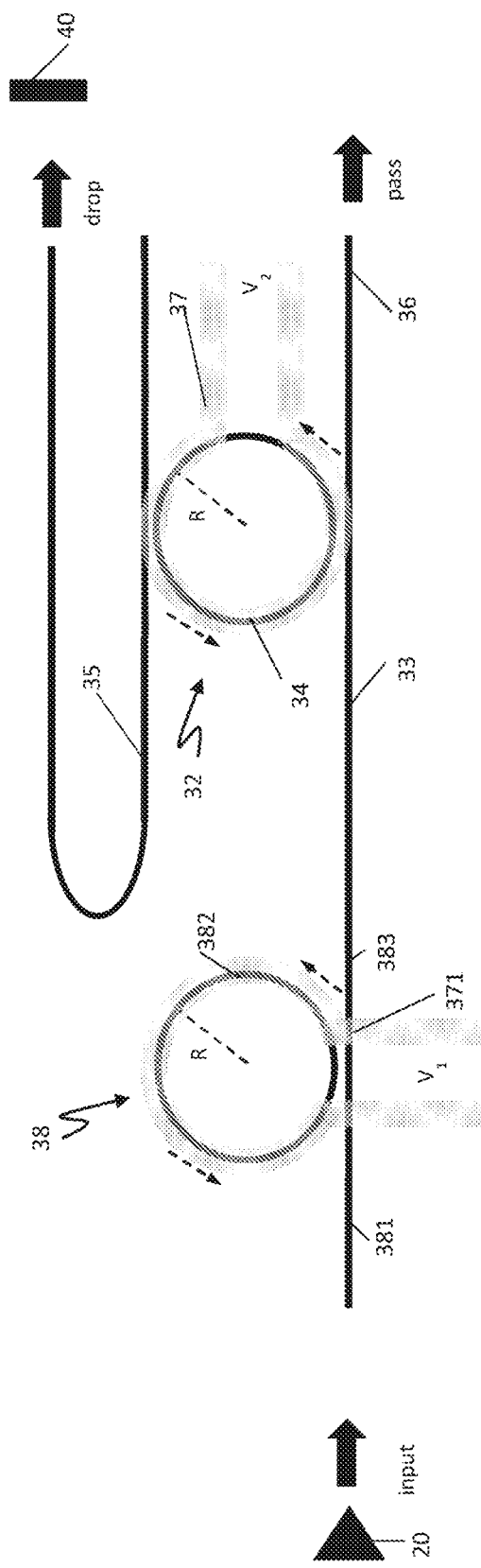
Figure 8:
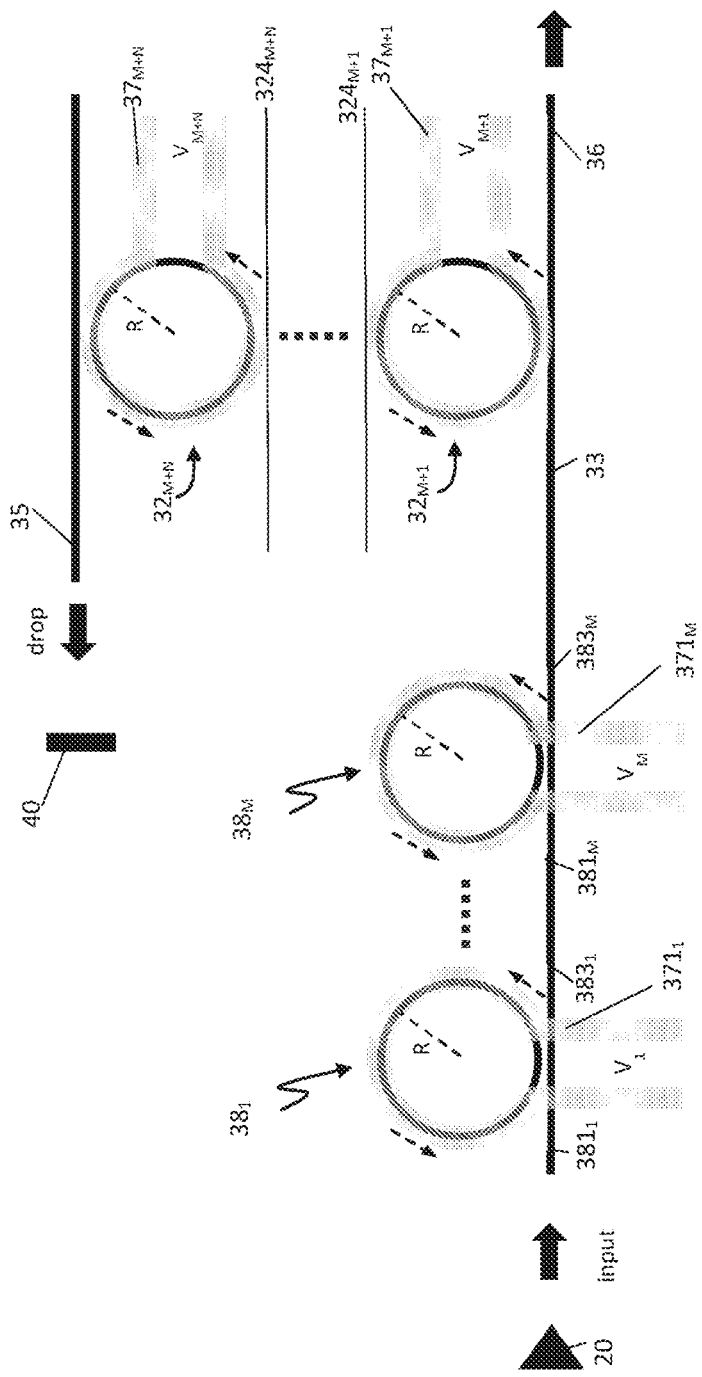
Figure 9:
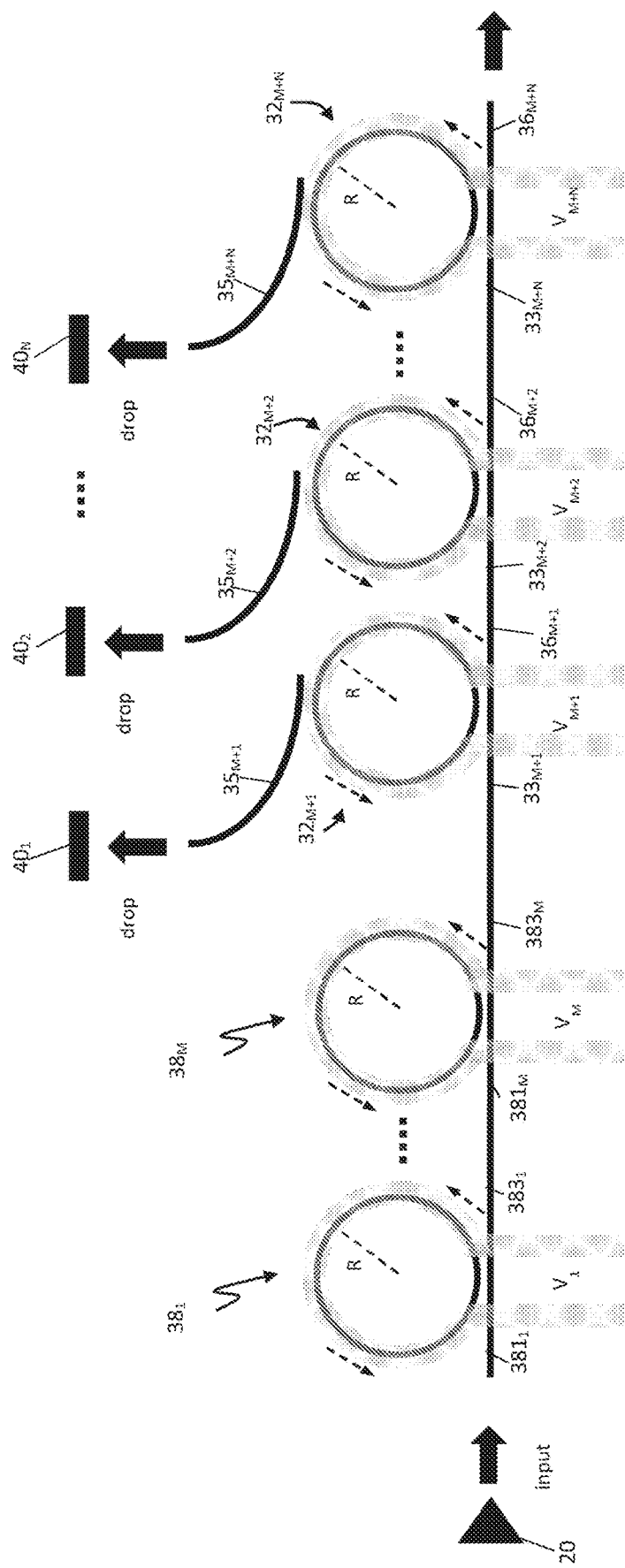
Figure 10:
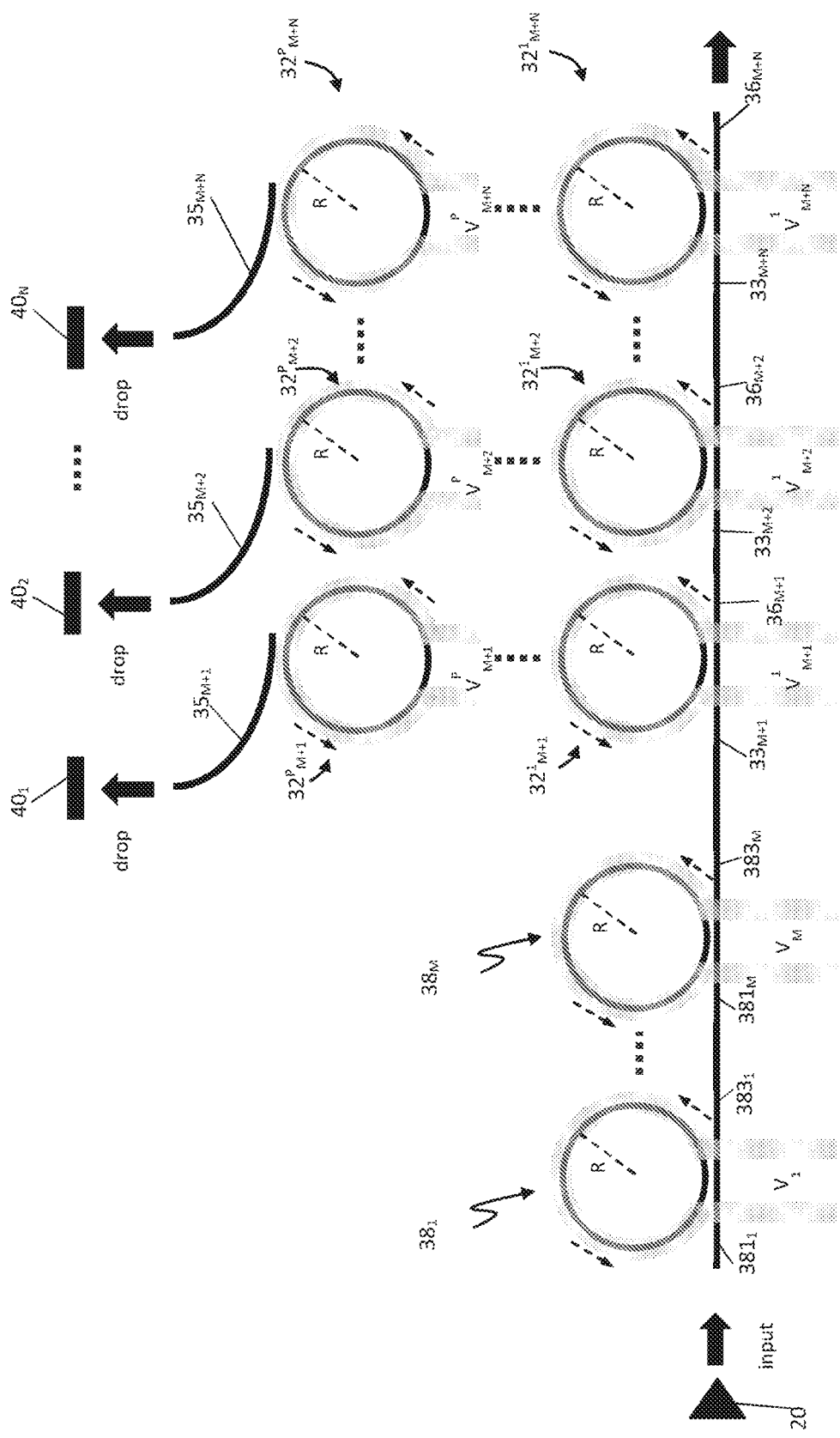
Figure 11:
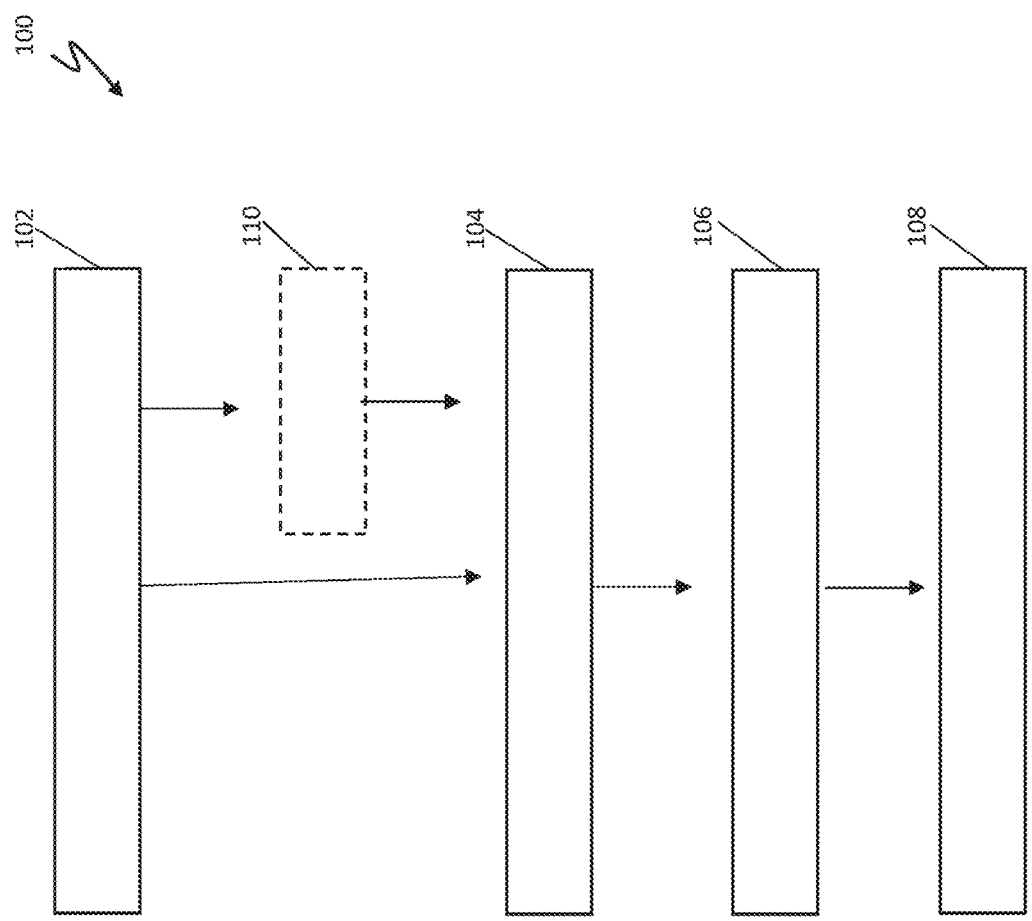
Figure 12:
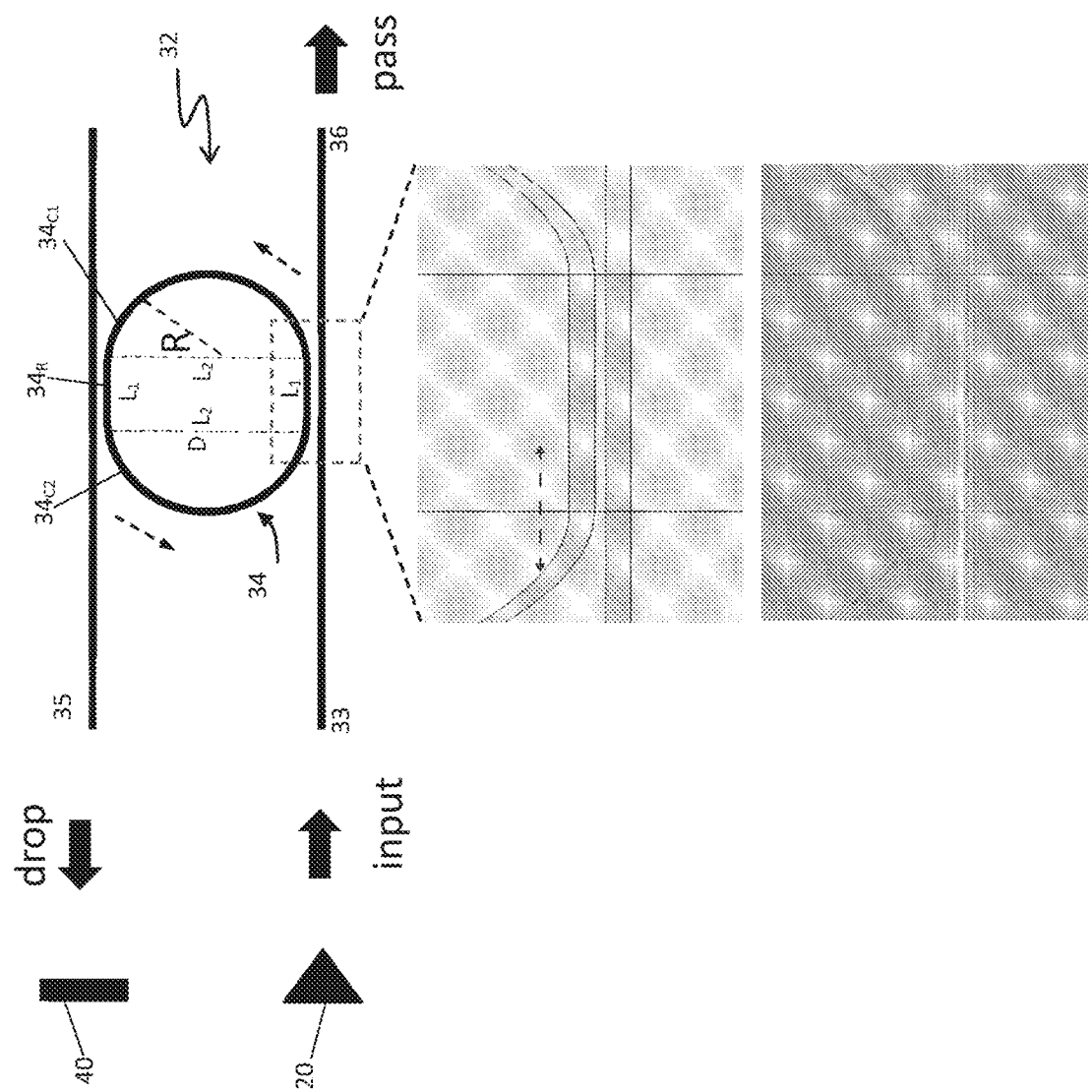
Figure 13:
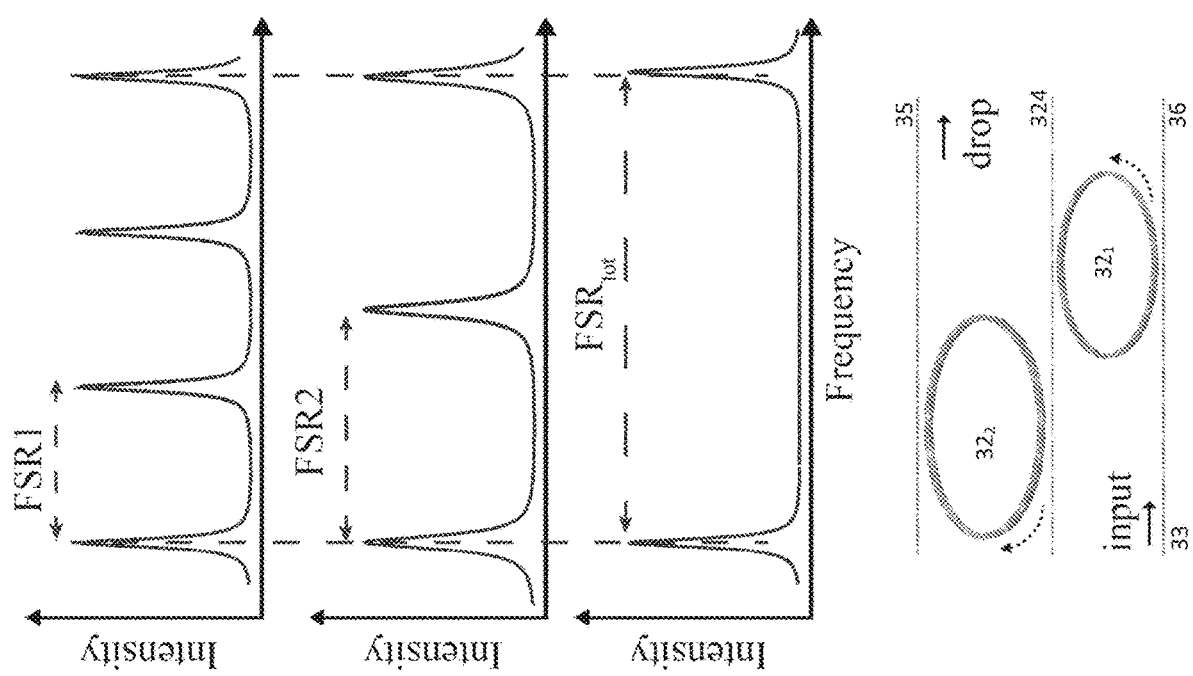
Figures 14A, 14B:
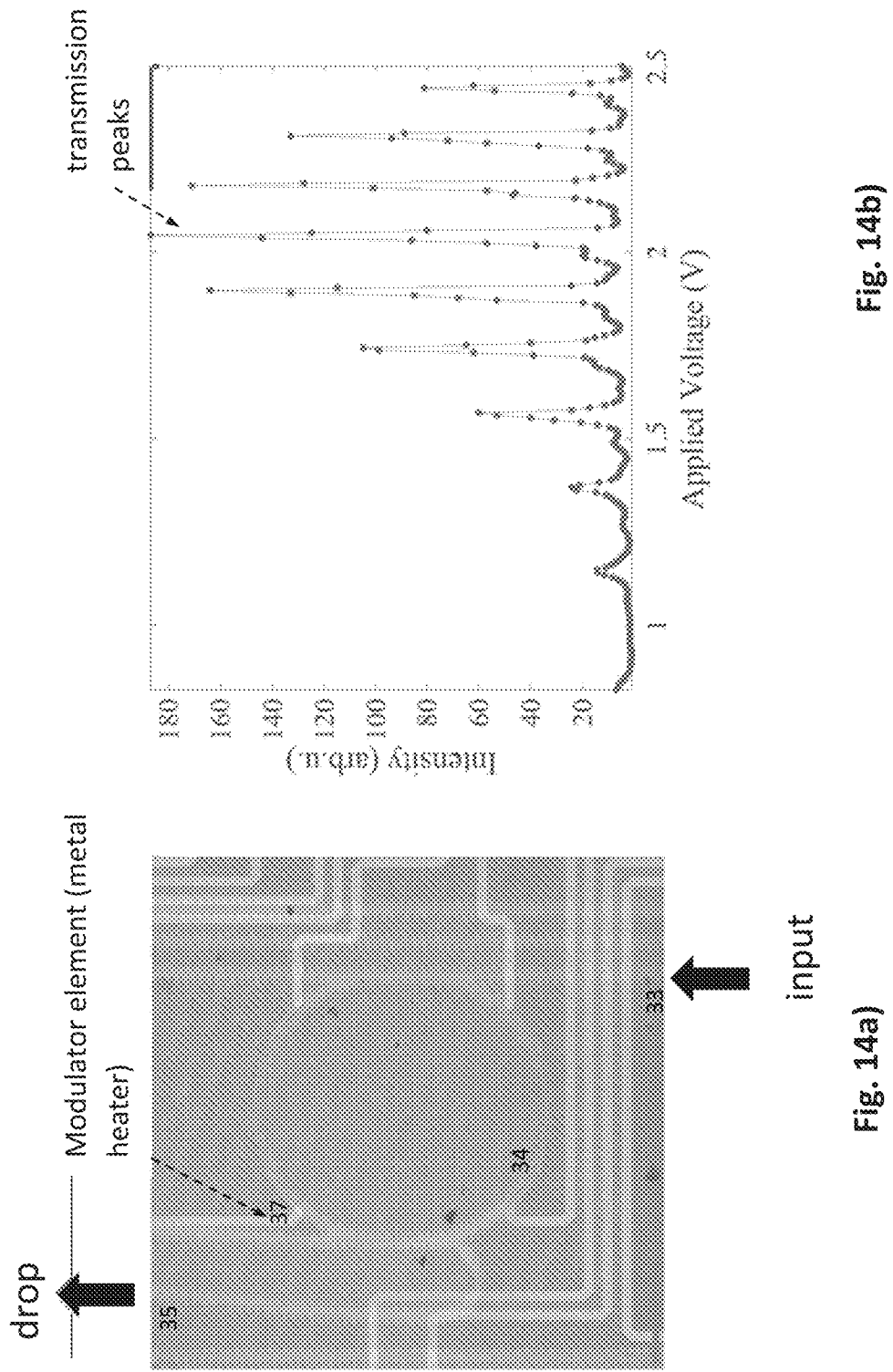
Figure 15B:
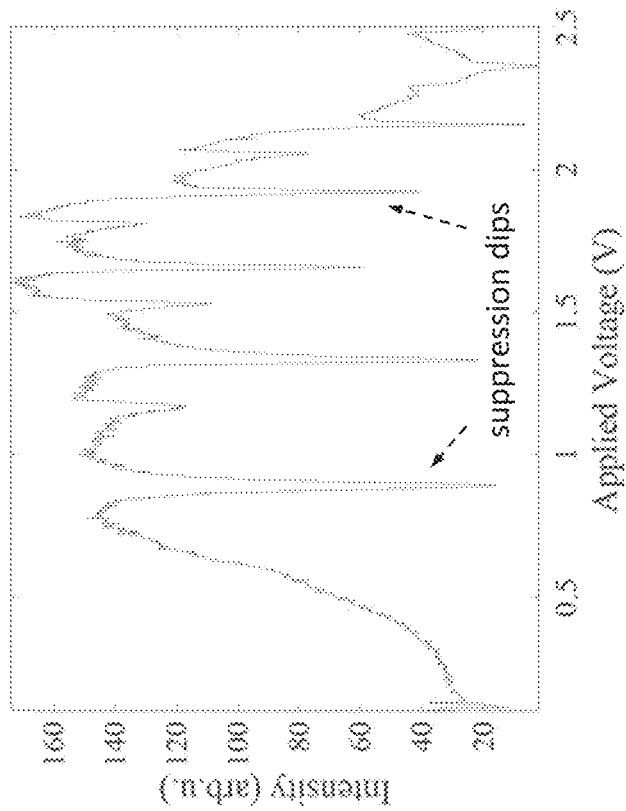
Figure 15A:
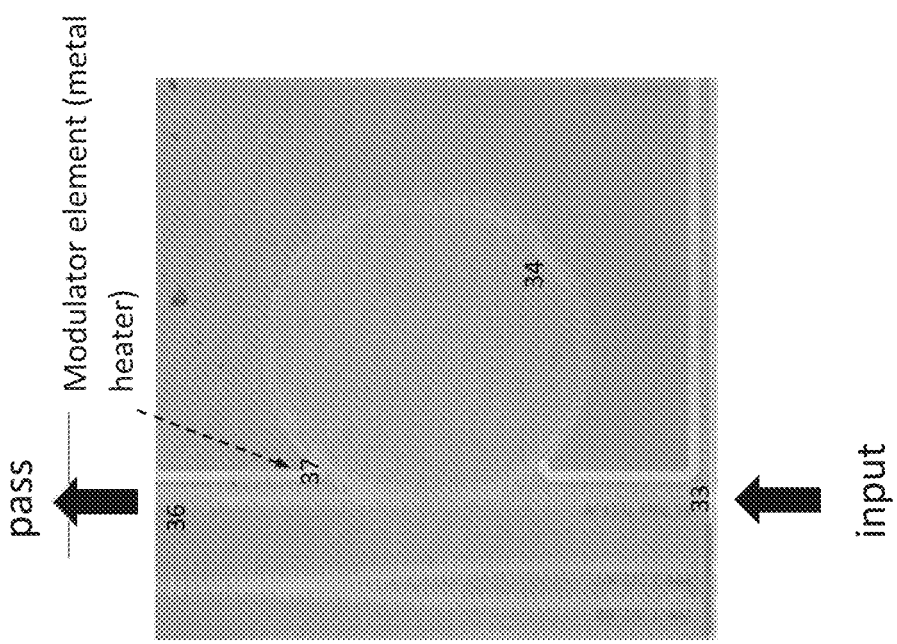

FIG. 4a-b show a schematic representation of an optical ring resonator (a) and a cross-section thereof (b);

FIG. 5a-b show a schematic representation of the spectral profiles obtained at the output waveguide (a) and at the pass waveguide (b) of an optical ring resonator;

FIG. 6a-d show a schematic representation of two cascaded optical ring resonators at the drop port (a) and at the pass port (b) and the associated intensity profile plots as well as a configuration having two (c) or more than two (d) cascaded optical resonators according to the present invention;

FIG. 7 shows a schematic representation of a configuration having an optical ring resonator of the second type coupled with an optical resonator of the first type;

FIG. 8 shows a schematic representation of a configuration having a plurality of optical ring resonators of the second type coupled with a plurality of optical resonators of the first type;

FIG. 9 shows a schematic representation of a second configuration having a plurality of optical ring resonators of the second type coupled with a plurality of optical resonators of the first type arranged in parallel;

FIG. 10 shows a schematic representation of a third configuration having a plurality of optical ring resonators of the second type coupled with a plurality of optical resonators of the first type arranged in cascade and in parallel;

FIG. 11 shows a flow chart illustrating the method for analyzing the spectrum of the Brillouin scattered light according to the present invention;

FIG. 12 shows a schematic circuit of a single optical ring resonator having the oblong shape of an oval;

FIG. 13 shows a schematic representation of ring resonators of the first type arranged in cascade and having different diameters;

FIG. 14a-b show experimental data of the resonance frequencies of oblong-shaped optical ring resonators mounted on an integrated circuit in which a light signal enters the input port and leaves at the drop port;

FIG. 15a-b show experimental data of the resonance frequencies of oblong-shaped optical ring resonators mounted on an integrated circuit in which a light signal enters the input port and exits through the pass port.

Figure 1:
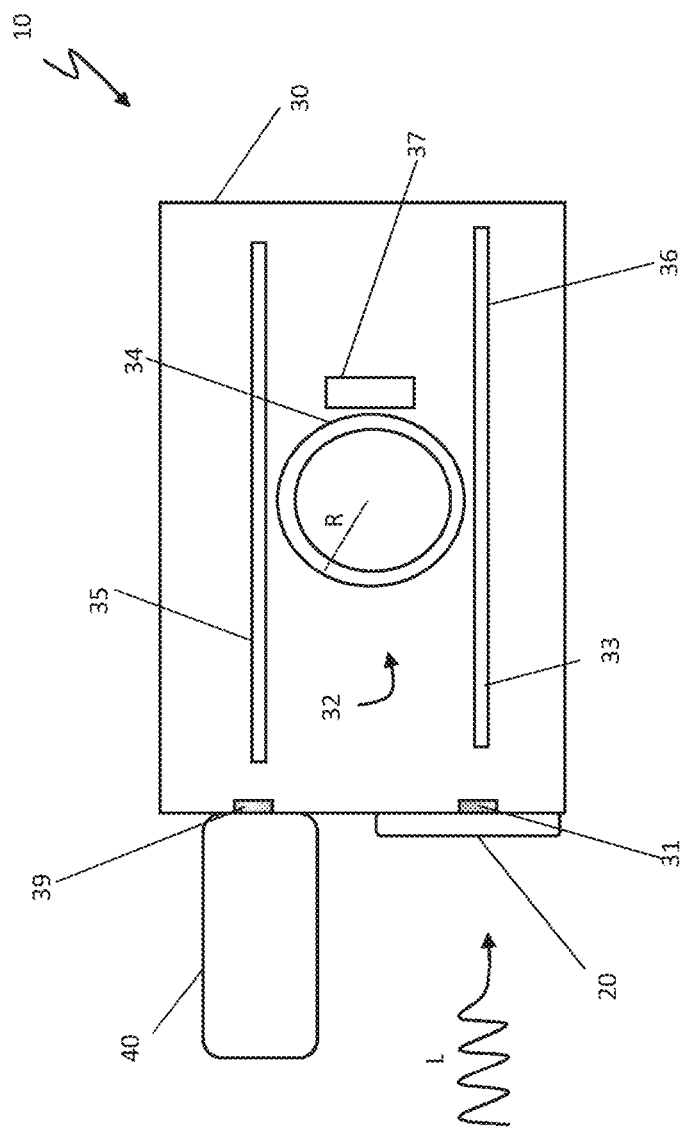
FIG. 1 shows a schematic representation of the spectrometer according to the present invention.

FIG. 1 shows an embodiment of a spectrometer 10 according to the present invention. The Brillouin scattered light L comprising an elastic component (Rayleigh) and an inelastic component (Stoke and Anti-Stokes peaks) arises from the interaction between a light source and a target material. The scattered light L is led by input means 20 into the selection means 30 through a main input 31. The selection means 30 comprise at least one optical ring resonator 32 which is made of at least an input waveguide 33, a closed ring waveguide 34, an output waveguide 35 and a pass waveguide 36. Inside the selection means 30, the light L is led through the input waveguide 33 into the closed loop waveguide 34. Given the resonance process similar to that occurring in a Fabry-Perot interferometer, only some frequency components of the scattered light are selected and separated from one to the other. In more details, the multiple frequency components are separated at the output of the optical ring resonator 32 by a quantity known as FSR (free spectral range), which depends both on the value of the radius R of the optical ring resonator and on the value of the group index $n_g$ of the waveguide, which is a particular type of refractive index that takes into account the dispersion of light. In order to measure the frequency shift, for example of the Brillouin scattered light, from the main frequency of the laser, as well as the linewidth of the Stokes and Anti-Stokes peaks, the frequency components can be scanned by locally varying the effective refractive index of the ring waveguide 43 through the modulator element 37 which varies the refractive index $n_{eff}$. The modulator element 37 is capable of performing a rapid scan (in the order of MHz and GHz) of the different frequency components through a variation of the optical path of the ring waveguide 34, providing a frequency tuning from the elastic Rayleigh light to the inelastic Stokes and Anti-Stokes light components, for example of the Brillouin scattered light. An optical detector 40, such as a photomultiplier or photodiode, is coupled to the output waveguide 35 to reconstruct the spectral profile of the frequency peaks during the scanning process. The variation of the $n_{eff}$ refractive index induced by the modulator 37 can take place in a discrete manner. An intensity value measured by the detector 40 corresponds to each discrete level of this variation of the $n_{eff}$ refractive index. In this way it is possible to reconstruct the entire spectral profile of the scattered light L coupled into the optical ring resonator 32.

The detector 40 can be integrated into the selection means 30 and being directly coupled to the output waveguide 35 of the optical resonator 32. Alternatively, the detector 40 can be an external and detachable element coupled to the selection means 30 through a main output 39 (as shown in FIG. 1). Finally, a modulator element 37 is coupled to the optical resonator 32, in particular to the closed ring waveguide 34.

Figure 2:
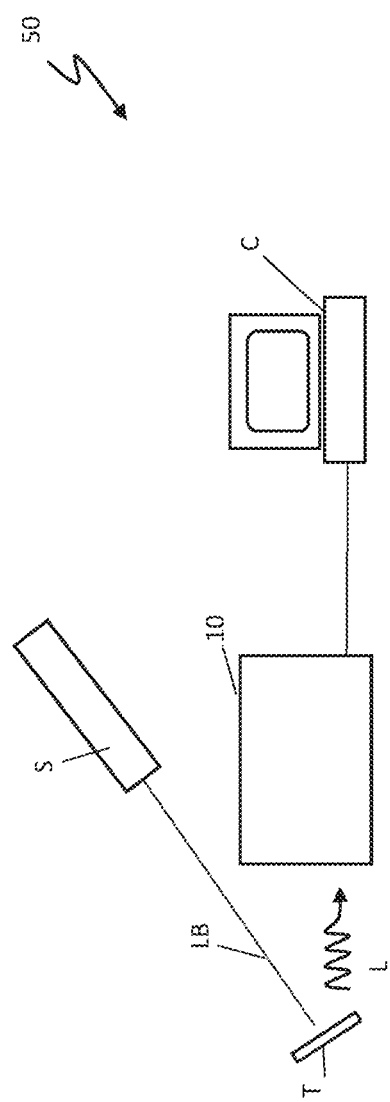
FIG. 2 shows a schematic representation of the apparatus according to the present invention.

FIG. 2 shows an apparatus 50 which comprises the spectrometer 10. The apparatus 50 can be, for example, an apparatus for Brillouin spectroscopy, microscopy or endoscopy or a similar technique. The apparatus 50 comprises a light source S, for example a laser source, which emits a light beam LB with a wavelength between 400 nm and 1500 nm propagating towards a target material T. The target T may be a biological material. The scattered light L is collected and analyzed by the spectrometer 10. By means of a computer system C, coupled to the spectrometer 10, the acquired data can be analyzed and appropriately displayed.

Figure 3:
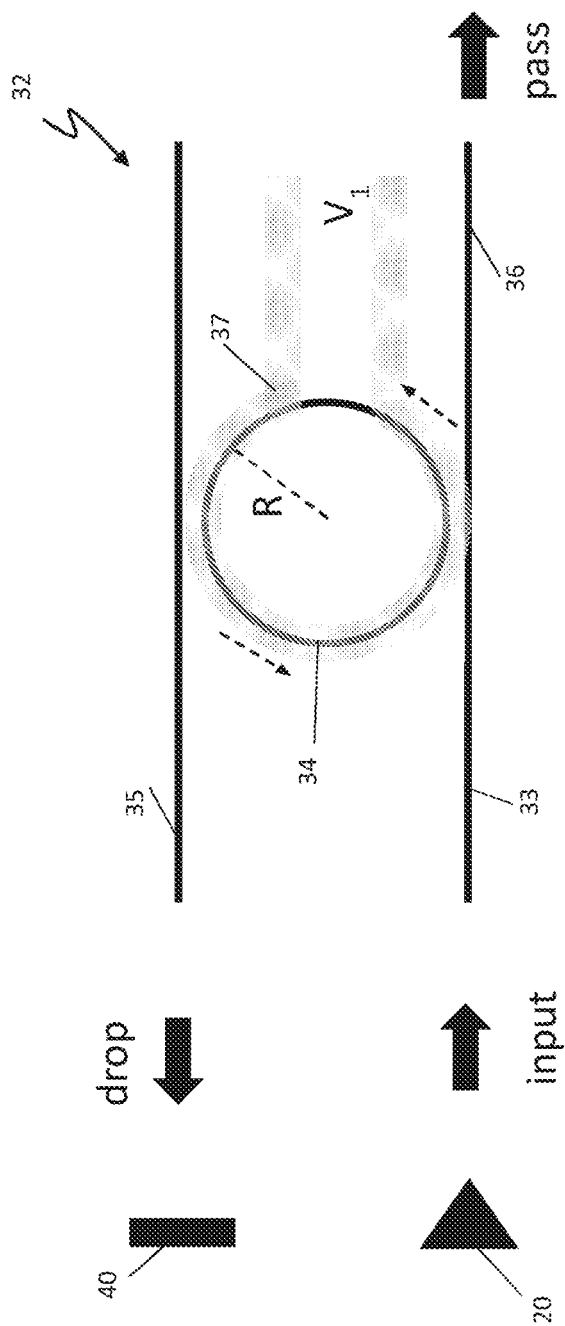
FIG. 3 shows a schematic representation of an optical ring resonator.

FIG. 3 shows a schematic circuit which integrates a single optical ring resonator of the first type 32. The scattered light L is led to the input waveguide 33 through the optical fiber coupler 20 and is indicated by an arrow at the "input" port of the circuit. A certain amount of light enters the ring waveguide 34 of the optical resonator 32 of radius R as a consequence of the presence of the evanescent field generated at the interface between the core region and the cladding region of the waveguide 34. As already anticipated previously, the coupling efficiency strictly depends on the distance d (shown in FIG. 4) of the ring resonator 32 from the input waveguide 33. Once the scattered light enters the closed ring waveguide 34, a constructive and destructive interference occurs, as described above. The dashed arrows in FIG. 3 represent the direction of the light path inside the closed ring waveguide 34. The light exiting the ring travels through the output waveguide 35, or at the "drop" port, to the optical detector 40. The non-selected light components by the closed ring waveguide 34 exit the ring through the pass waveguide 36 and reach the "pass" port of the circuit. The modulator element 37 is coupled to the closed ring waveguide 34 for adjusting the resonance frequency of the optical ring resonator 32. For example, the modulator element 37 can comprise a heating system to which a voltage $V_1$ is applied.

FIG. 4b shows an exemplary configuration of the modulator element 37 inside a circuit (or chip) that integrates the optical resonator 32. Specifically, the modulator element 37 comprises a series of micro-heaters positioned on the upper side of the closed ring waveguide 34. It should be noted that FIG. 4b represents a cross-section of the circuit along the dotted line shown in FIG. 4a. The Cartesian axes shown in FIGS. 4a and 4b better clarify this concept. FIG. 4b further illustrates how the modulator element 37 is only located above the closed ring waveguide 34 to vary the optical path of said waveguide. The input 33, output 35 and pass 36 waveguides are located at a distance d from the ring waveguide 34. The modulating elements 37 or micro-heaters can be made of conductive materials such as titanium, platinum, nickel, chromium, or similar. The modulator elements 37 can be made of only one of these materials or a combination of two or more materials. Specifically, the circuit can comprise a core region 341 where the light propagates, for example realized in $Si_3N_4$ and which comprises the input 33, output 35, pass 36, and ring 34 waveguides. The circuit further comprises a cladding region 342 and 343, for example made of $SiO_2$, as well as a substrate 344, for example made of silicon, on which the cladding region 342, 343 is located.

FIGS. 5a and 5b show the spectral profiles obtained at the "drop" port (FIG. 5a) and at the "pass" port (FIG. 5b). FIG. 5a shows the transmission of multiple elastic peaks ($E_n$, $E_{n+1}$) which are separated by one FSR (free spectral range) dependent on the value of the radius R of the optical ring resonator and on the effective refractive index $n_{eff}$ of the waveguide. FIG. 5a also shows the transmission of the inelastic Stokes and Anti-Stokes peaks (dotted line) for example of the Brillouin scattered light ($B_n$, $B_{n+1}$) arising along one FSR of the spectrometer. For a core region 341 realized with $Si_3N_4$ having a refractive index n~2 and a cladding region 342, 343 made of $SiO_2$ having a refractive index n~1.4 and therefore with an effective refractive index $n_{eff}$=1.4-1.8, for a ring radius R=(100-1000) μm, it is obtained a value of the FSR that is suitable for Brillouin spectroscopy (FSR=30-120 GHz). Using the same materials for the core region 341 and the cladding region 342, 343 but with a radius of value of R=(1-100) μm, it is obtained a FSR value suitable for the Raman THz spectroscopy (FSR=0.3-6.0 THz). The spectral contrast (SC), which is defined as the intensity ratio between the peak and the background, can assume, in the case of a single ring resonator of the first type 32, a value up to about 30 dB. On the other hand, the spectral resolution can be associated with the FWHM (Full-Width-at-Half-Maximum) bandwidth of the transmitted peaks and, in the case of Brillouin spectroscopy, assumes a value in the order of 100 MHz. As described above, in order to measure both the Brillouin frequency shift with respect to the main laser frequency and the bandwidth of the Brillouin peaks, it is necessary to scan the frequency components through the use of a modulator element that varies the effective refractive index $n_{eff}$ of the waveguide. A complete spectral profile, including at least one Rayleigh peak (E) and one Brillouin peak (B), can be reconstructed by detecting the output intensity values associated with the discrete $n_{eff}$ variation at the drop port using an optical detector.

At the pass port (FIG. 5b) it is obtained the inverse intensity profile with respect to that obtained at the drop port. This is the result of the energy conservation. A circuit with an optical ring resonator where the output port corresponds to the pass port is extremely useful as a narrow-band optical filter of certain wavelengths. The extinction ratio (ER) for a single-ring optical resonator is always 30 dB and depends on the optical losses of the ring.

Figure 6A:
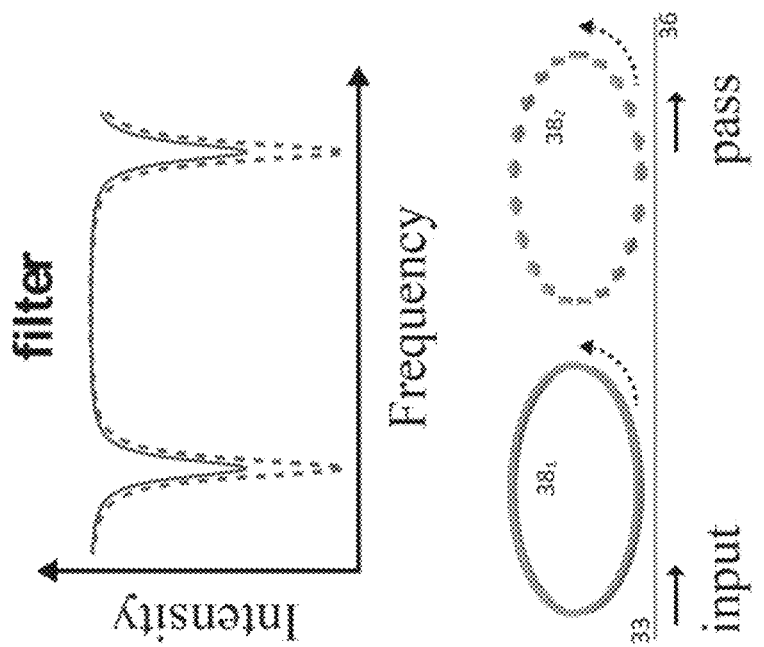
Figure 6B:
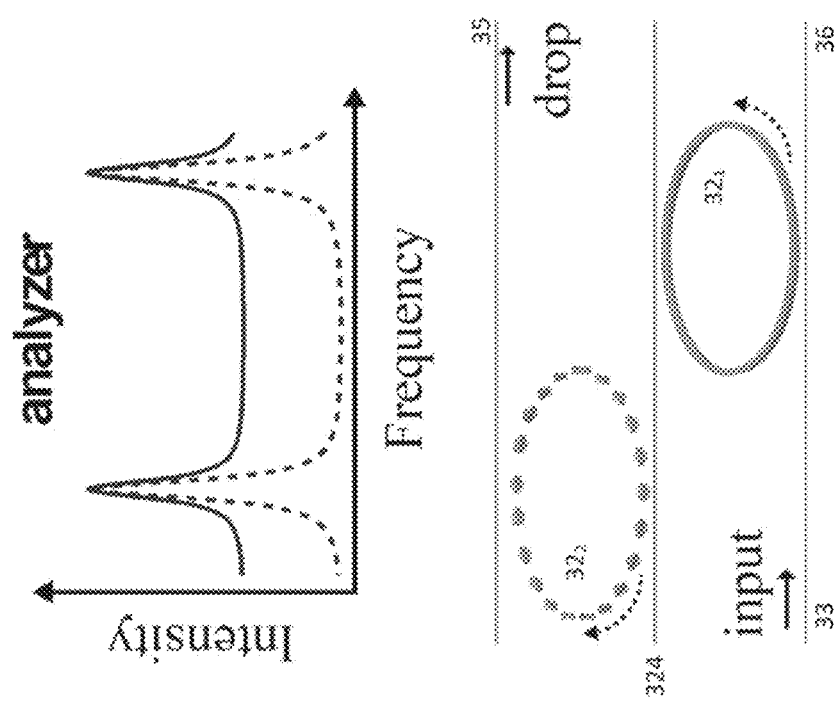

To increase the spectral contrast of the spectrometer 10, it is possible to use two or more optical ring resonators of the first type 32 in cascade. For example, two identical optical ring resonators of the first type $32_1$ and $32_2$, each providing 20 dB in the spectral contrast and arranged in cascade at the drop port, work as an effective spectral analyzer providing a total contrast of 40 dB (FIG. 6a). In the same way, two identical ring resonators of the second type $38_1$ and $38_2$, each providing an extinction ratio of 20 dB and arranged in cascade at the pass port, work as an effective spectral filter providing a total extinction value of 40 dB (FIG. 6b). It can be noted that in the vertical cascade arrangement (FIG. 6a), i.e. at the exit of the drop port, the ring resonators of the first type $32_1$ and $32_2$ are displaced with respect to each other to avoid a resonant effect. The curved dashed arrows indicate the path of the light inside the waveguide. This means that a possible third ring resonator of the first type $32_3$ (not shown in the figure) would be shifted to the right with respect to the second ring resonator $32_2$ and located along the same vertical axis of the first ring resonator $32_1$ according to a zigzag configuration.

It is also noted that an intermediate BUS waveguide $32_4$ is located between the first ring resonator $32_1$ and the second ring resonator $32_2$.

Figure 6D:
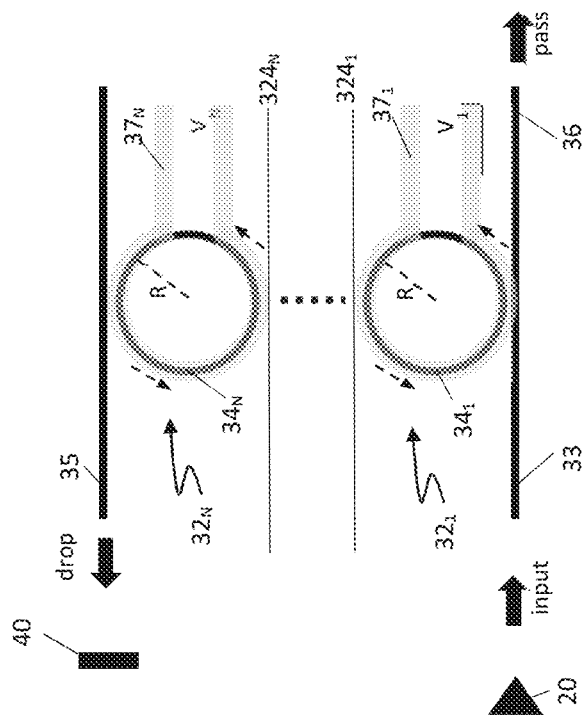
Figure 6C:
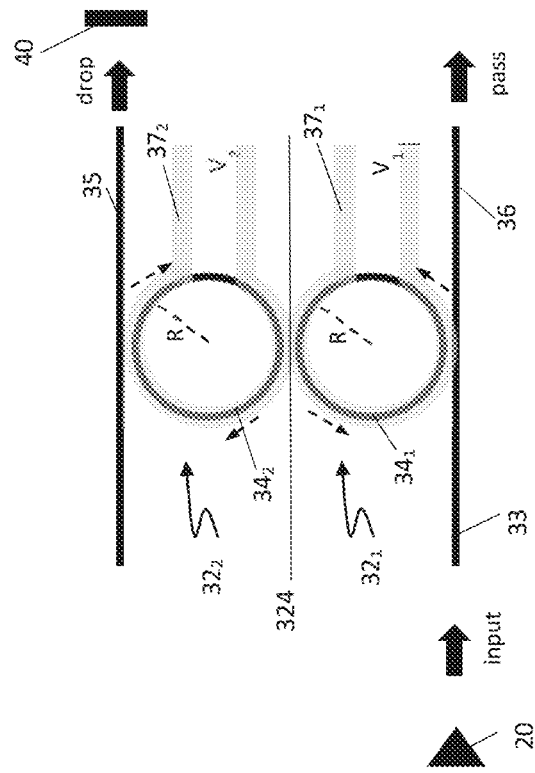

FIG. 6c shows a configuration where two optical ring resonators of the first type $32_1$ and $32_2$ are coupled together by means of the respective closed ring waveguides $34_1$ and $34_2$ and the intermediate waveguide $32_4$. FIG. 6d shows the general case of a plurality of N said optical resonators. In other words, the limited spectral contrast of a single optical ring resonator can be increased by adding the spectral contrast contribution of the next resonator. The resonators in FIG. 6 show ring waveguides that have the same radius R. However, it is also possible to arrange the spectrometer 10 with optical ring resonators of different radii. Furthermore, each ring waveguide is coupled to an associated modulator element $37_1$, $37_2$, ... $37_N$ to which a voltage $V_1$, $V_2$, ... $V_N$ is applied. The voltage may be different depending on the optical ring resonator for tuning a specific resonance frequency of the resonator and thus to avoid spectral broadening. This is necessary to compensate for small fab imperfections on the optical path length of the waveguides that could induce a slight shift in the resonance frequency for each ring resonator. It should be noted that the optical resonators of the first type 32 shown in FIGS. 6c and 6d are arranged one above the other only for graphic convenience but instead they must be intended as displaced as in the case of FIG. 6a.

FIG. 7 shows a schematic circuit which, besides a single optical ring resonator of the first type 32, also integrates a single optical ring resonator of the second type 38. In more details, the optical resonator of the second type 38 is located between the input port or circuit input and the optical resonator of the first type 32. FIG. 8 shows a configuration in which a plurality of optical ring resonators of the second type $38_1$, ... $38_M$, are arranged between the input port of the circuit and a plurality of optical ring resonators of the first type $32_{M+1}$, ... $32_{M+N}$. The optical resonator of the second type 38 operates in this configuration through the pass port as an optical filter to suppress the elastic component (Rayleigh) of the scattered light, the latter being typically a few orders of magnitude more intense than the inelastic components of the scattered light. By suppressing or attenuating this elastic component of light, the visibility of the Brillouin peaks can be significantly increased. Furthermore, this can prevent a saturation of the optical detector during the scanning process. In order to avoid any kind of interference between the light coming out of the drop port and the optical ring resonator of the second type 38, as shown in FIG. 7, the output waveguide 35 can be advantageously deviated from the direction of the optical ring resonator of the second type 38, thus assuming a curvilinear shape. This deviation is useful for preventing the elastic components of the scattered light rejected by the ring resonator of the second type 38 from being coupled again in the drop port at the ring waveguide $38_2$ of the second type 38, thus eliminating the advantages of the filter provided by the ring waveguide $38_2$ of said optical ring resonator of the second type 38.

In more details, the elastic light can be effectively suppressed or attenuated by fine tuning the voltage $V_M$ applied to each optical ring resonator of the second type $38_1, \ldots 38_M$. As a result, only the Brillouin signals will be detected at the drop port after the scan process by means of the modulating elements $37_{M+1}, \ldots 37_{M+N}$ of the optical ring resonators of the first type $32_{M+1}, \ldots 32_{M+N}$ arranged in cascade. It should be noted that the optical resonators of the first type 32 shown in FIG. 8 are arranged one above the other for pure graphic convenience but instead they must be conceived to be displaced vertically as in the case of FIG. 6a.

FIG. 9 shows an alternative schematic circuit which integrates a plurality of optical ring resonators of the first type $32_{M+1}, 32_{M+2}, \ldots 32_{M+N}$ arranged in parallel with a plurality of optical ring resonators of the second type $38_1, \ldots 38_M$. Unlike the previous configurations, the optical ring resonators of the first type $32_{M+1}, 32_{M+2}, \ldots 32_{M+N}$ are arranged in parallel so that each one is coupled to a different drop port. This distribution enables either through a suitable periodic modulation of the effective refractive index of each ring or through a variation of the radius of the rings to simultaneously select all the light frequency components distributed along an FSR. Consequently, a single optical detector $40_1, 40_2, \ldots 40_N$ is associated to each optical ring resonator of the first type $32_{M+1}, 32_{M+2}, \ldots 32_{M+N}$. In this case, the modulators that act on the optical resonators of the first type $32_{M+1}, 32_{M+2}, \ldots 32_{M+N}$ are not used to perform a frequency scan, but rather to apply a periodic modulation so that each ring selects only one specific frequency at the output of its associated drop port, allowing other non-selected frequencies to pass through the pass port. In this way, while a single optical detector $40_i$ would measure the intensity of a single light component with frequency vi, the subsequent optical detector $40_{i+1}$ arranged in parallel would measure the intensity of a single light component with frequency $v_{i+1}=v_i+\delta v$. Following this approach, all frequencies contained within a spectral range defined by at least one single FSR would be measured simultaneously. To exploit the effective spectral resolution of the spectrometer, the number N of optical ring resonators of the first type arranged in parallel ideally should be twice the finesse, defined as the FSR/FWHM ratio of the spectrometer. However, in order to enable a faster acquisition and to reduce the number of optical detectors being used (and thus the production cost of the on-chip spectrometer), this number N could also be less than 2*finesse.

FIG. 10 shows an alternative schematic circuit which integrates a plurality of optical ring resonators of the first type $32_{M+1}, 32_{M+2}, \ldots 32_{M+N} \ldots 32^P_{M+1}, 32^P_{M+2}, \ldots 32^P_{M+N}$ with a plurality of optical ring resonators of the second type $38_1, \ldots 38_M$. Unlike the previous configurations, this configuration comprises ring resonators of the first type arranged both in cascade and in parallel. In particular, while an optical detector at the output of the drop port of a series of cascaded resonators measures the intensity of a single light component with frequency vi, the next one measures the intensity of the following frequency component $v_{i+1}=v_i+\delta v$ selected through the parallel series of cascaded resonators. In essence, the configuration illustrated in FIG. 10 differs from that of FIG. 9 because the contrast SC and the spectral resolution FWHM of the spectrometer can be increased by means of a plurality of ring resonators of the first type arranged in cascade, as already described for the configuration of FIG. 6. In a similar way to FIG. 9, the configuration described in FIG. 10 allows to acquire the entire spectrum of the scattered light without the need to perform a frequency scan. In this regard, the modulators present in this configuration have the only purpose on the one hand of adjusting the resonance frequency among the waveguides of the cascaded ring resonators, and on the other of introducing a periodic modulation of the effective refractive index (and therefore of the optical path) among the ring resonators arranged in parallel. It should be noted that the optical resonators of the first type 32 shown in FIG. 10 are arranged one above the other for pure graphic convenience but instead they must be intended to be displaced vertically and provided with corresponding intermediate BUS waveguides 324 as in the case of FIG. 6a.

FIG. 11 shows a flowchart of the method 100 for analyzing the spectrum of the Brillouin scattered light. The method 100 initially involves the step 102 of receiving the scattered light L. The Brillouin scattered light comprising an elastic component (Rayleigh) and an inelastic component (Stokes and Anti-Stokes peaks) arises from the interaction between the light source S and a target material T. The method 100 further involves the step of selecting and separating 104 certain multiple frequency components of the scattered light L by leading the scattered light L in an input waveguide 33 of at least one optical ring resonator of the first type 32. Next, the method 100 involves the scanning 106 of the different multiple frequency components by means of a modulator element 37 of the effective refractive index $n_{eff}$ of a closed ring waveguide 34 of said optical ring resonator of the first type 32 by varying the optical path of the closed ring waveguide 34. Finally, method 100 involves the steps of measuring 108 the intensity of the frequency components and reconstructing the spectrum profile of the scattered light L.

Before the step of selecting and separating 104 the frequency components of the scattered light L by means of an optical ring resonator of the first type 32, the method 100 can further involve the step of suppressing or attenuating 110 the elastic components of the scattered light L by leading the scattered light L in an input waveguide 381 of at least one optical ring resonator of the second type 38.

FIG. 12 shows a schematic circuit which integrates a single optical ring resonator of the first type 32 having the oblong shape of an oval as described above. Of course, this also applies to the ring resonator of the second type 38. The scattered light L, indicated with an arrow at the port "input" of the circuit, is led to the input waveguide 33 by means of the optical fiber coupler 20. It should be noted that the oval ring waveguide is constituted by a central rectangular region $34_R$ joined at the sides by two semicircle regions $34_{C1}$ and $34_{C2}$ of radius R. In particular, if the central region $34_R$ is defined by the sides $L_1$ and $L_2$, the diameter D=2R of each half-circle $34_{C1}$ and $34_{C2}$ coincides with one of the sides of the central region $34_R$, in particular with the side that does not form the oblong ring. According to the example shown in FIG. 12, the diameter D of each semicircle $34_{C1}$ and $34_{C2}$ coincides with the length of the side $L_2$ of the central region $34_R$. The total length of the ring will therefore be determined by the sum of the two semicircles of radius R and of the two sides $L_1$. A given amount of light enters the ring waveguide 34 of the optical resonator 32 following the formation of the evanescent field generated at the interface between the core region and the cladding region of the waveguide 34 (illustrated in details in the bottom figure showing a simulation of a light beam that is partially coupled into the ring waveguide from the input waveguide). Thanks to the oblong shape of the ring, the coupling efficiency is increased. Once the scattered light enters the closed ring waveguide 34, constructive and destructive interference takes place, as described above. The dashed arrows in FIG. 12 represent the direction of the light path inside the closed ring waveguide 34. The light coming out of the ring is led through the drop port 35 to the optical detector 40.

FIG. 13 shows a configuration in which ring resonators of the first type $32_1$ and $32_2$ are arranged in cascade and have different diameters from each other. For simplicity, the figure only shows two ring resonators. However, the same principle can be applied to a plurality of ring resonators of the first type. Furthermore, the figure shows a configuration of increasing diameter where a second ring resonator $32_2$ has a larger diameter with respect to that of a first ring resonator $32_1$. However, the same principle can also be applied for a decreasing diameter configuration. FIG. 13 highlights that this kind of configuration determines a total Free Spectral Range ($FSR_{tot}$) given by the combination of the $FSR_1$ and $FSR_2$ associated with each ring. As a result, it is possible to extend the Free Spectral Range of the total system by combining ring resonators with variable diameters.

FIGS. 14 and 15 show the resonance frequencies measured for oblong-shaped optical ring resonators mounted on an integrated circuit. In particular, FIG. 14a shows an image of a resonator in which a light signal enters through the input port and exits at the 'drop' port. By changing the voltage applied to the modulator element 37 arranged above the ring waveguide 34, several peaks associated with the specific resonance frequencies of the ring are obtained in transmission (FIG. 14b). This process is similar to that of a Fabry-Perot interferometer used to scan the Brillouin light spectrum.

FIG. 15a shows an image of a resonator in which a light signal enters through the input port and exits through the 'pass' port. By changing the voltage applied to the modulator element 37 arranged above the ring waveguide 34, several dips associated with the specific resonance frequencies of the ring are obtained in transmission (FIG. 15b). These dips are used to suppress the (very intense) elastic light signal that would otherwise prevent the detection of Brillouin peaks. In this regard, a ring resonator arranged in this configuration works as a filter of the elastic light, thus increasing the visibility of Brillouin spectral peaks.

To the spectrometer, to the apparatus, to the method and to the use described above, a skilled person of the field, in order to satisfy further and contingent needs, may make several further modifications and variations, all of which are included in the scope of protection of the present invention as defined by the claims.

The invention claimed is:

1. Spectrometer for analyzing the spectrum of a Brillouin scattered light, comprising:
   input means for receiving the scattered light;
   selecting means coupled to the input means for selecting and separating specific multiple frequency components of the scattered light, wherein said selecting means comprise at least one main input; and
   at least an optical detector coupled to the selecting means for measuring the intensity of the different frequency components and reconstructing the spectrum profile of the scattered light,
   wherein the selecting means are composed by an optical integrated circuit having at least an input port, at least an output port and at least an pass port, said circuit comprising at least one optical ring resonator of a first type having an input waveguide for receiving the light, a closed loop waveguide having an effective refractive index $n_{eff}$ and coupled to the input waveguide for selecting at least a specific frequency $v_{res}$ of the scattered light, an output waveguide coupled to the closed loop waveguide for the output of the selected frequencies and a pass waveguide coupled to the input waveguide and to the closed loop waveguide for the output of the not selected frequencies,
   wherein the selecting means further comprise at least a modulator element coupled to the closed loop waveguide of the optical ring resonator of the first type for modulating the effective refractive index $n_{eff}$ and scanning the different multiple frequency components through the variation of the optical path of the closed loop waveguide and wherein the selecting means comprise at least an optical ring resonator of a second type for suppressing or attenuating the elastic components of the scattered light, wherein said optical ring resonator of the second type is positioned between the input port of the optical integrated circuit and the optical ring resonator of the first type, wherein the optical ring resonator of the second type comprises a pass waveguide coupled to the input waveguide of the optical ring resonator of the first type.

2. Spectrometer according to claim 1, wherein the closed loop waveguide of the optical ring resonator of the first type has the shape of a circumference having a radius R or has an oblong shape like an oval made of the conjunction of a central rectangular region with two semicircles at the opposite sides of said central region, wherein both semicircles have a diameter D=2R.

3. Spectrometer according to claim 2, wherein the radius R of the circumference or the semicircles of the closed loop waveguide of the optical ring resonator of the first type has a value comprised between 100.0 µm and 1.0 mm.

4. Spectrometer according to claim 1, wherein the optical integrated circuit comprises a core region where the light is propagated inside the waveguides and which is made of a material transparent in the field of the visible and of the near infrared and a cladding region which is made of a material having a refractive index lower than that of the core region which surrounds the core region.

5. Spectrometer according to claim 1, wherein the selecting means comprise a plurality of optical ring resonators of the first type arranged in cascade, wherein the closed loop waveguide of a first optical resonator is coupled with the closed loop waveguide of a second successive optical resonator and wherein between the closed loop waveguide of the first optical resonator and the closed loop waveguide of the second successive optical resonator are located detuning means.

6. Spectrometer according to claim 5, wherein the optical ring resonators of the first type arranged in cascade have am increasing or decreasing variable radius with a factor comprised between 0.9 and 0.999.

7. Spectrometer according to any claim 1, wherein the distance (d) between the closed loop waveguide and the input waveguide of the optical resonator of the first type has a value comprised between 50 nm and 500 nm.

8. Apparatus for the spectroscopy or microscopy or endoscopy of Brillouin comprising the spectrometer according to claim 1.

9. Method for reducing the size of an optical system of Brillouin spectroscopy, microscopy or endoscopy for the analysis of the mechanical and structural properties of a sample, said optical system comprising at least one light source incident on said sample and generating a scattered light, an optical apparatus for receiving and measuring the scattered light spectrum, by acquiring data as a function of the frequency of said scattered light, and a computer system for analyzing said data, wherein the method comprises the step of replacing said optical apparatus with the spectrometer according to claim 1.

10. Method for analyzing the spectrum of a Brillouin scattered light, comprising:
receiving the scattered light;
selecting and separating specific multiple frequency components of the scattered light by conducting the scattered light in an input waveguide of at least one optical ring resonator of a first type;
scanning the different multiple frequency components through at least a modulator element that modulates the effective refractive index $n_{eff}$ of a closed loop waveguide of said optical ring resonator of the first type through the variation of the optical path of the closed loop waveguide;
measuring the intensity of the frequency components and reconstructing the spectrum profile of the scattered light; and
suppressing or attenuating the elastic components of the scattered light by conducting the scattered light in an input waveguide of at least one optical ring resonator of a second type before selecting and separating the frequency components of the scattered light through the optical ring resonator of the first type.

* * * * *